Patented June 25, 1940

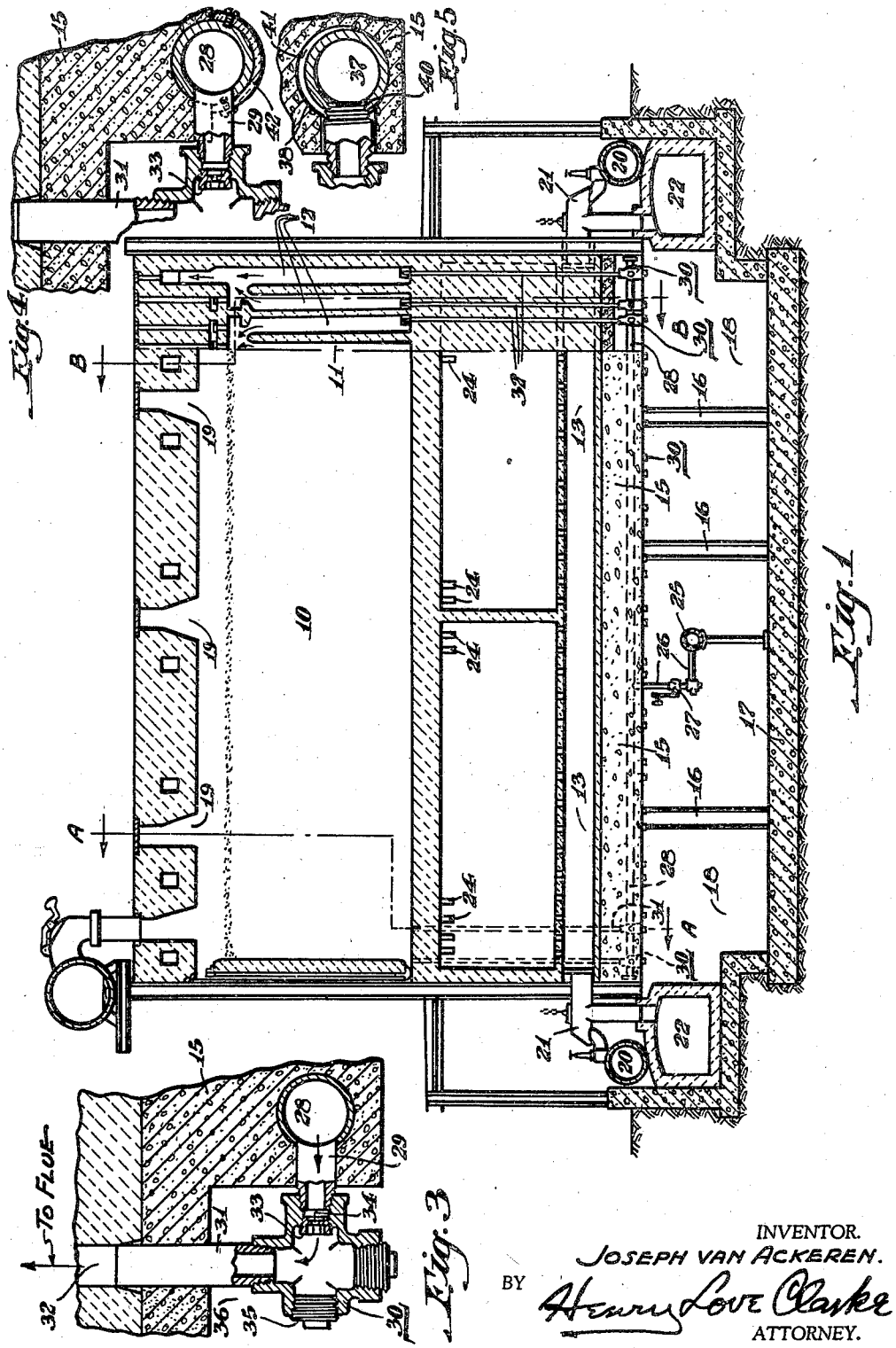

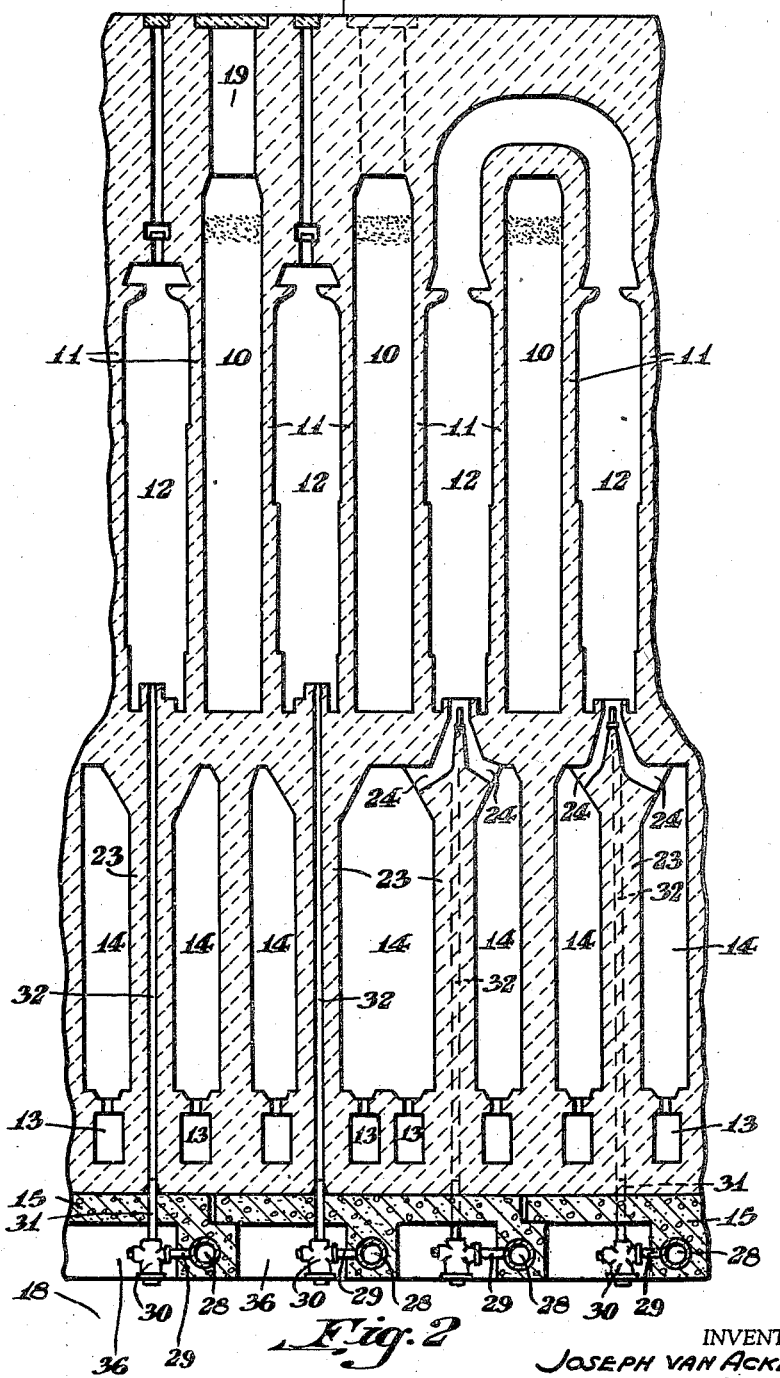

2,205,839

UNITED STATES PATENT OFFICE 2,205,839

COKING RETORT OVEN

Joseph van Ackeren, Pittsburgh, Pa., assignor to Koppers Company, a corporation of Delaware Application August 2, 1939, Serial No. 288,015

13 Claims. (Cl. 202—141)

The present invention relates to horizontally-elongated coke ovens and contemplates more especially improvements in the rich fuel-gas distribution systems of coke ovens having their heating-gas distributed to the heating flues according to the well-known underjet principle.

An object of the present invention is to furnish a simple, novel and advantageous improvement in the disposition, within the structure of an underjet coke-oven battery, of those header-pipes that comprise their rich fuel-gas distribution systems and are arranged to supply such heating media to heating flues of individual heating walls.

Another object of the present invention is to remove said heating-wall header-pipes from those spaces in the structures of underjet coke-oven batteries wherein they are subjected to comparatively wide and detrimental fluctuations of temperature and to provide them with novel locations in the battery block where they will be relatively slightly influenced by external conditions of temperature and they can be easily and automatically maintained throughout their entire length above those temperatures at which condensates will be precipitated from rich heating-gas flowed therethrough.

A further object of the invention is the provision for underjet batteries of means whereby the rich heating-gas can be supplied, from a common conduit and at a substantially uniform temperature throughout an entire battery, to each of those flow-control means that regulate the volumes of rich gas introduced into the individual heating flues, thereby tending both to decrease the diversity of the calibrated apertures previously required in the gas-flow control-means and to promote and to simplify maintenance of uniform heating-wall temperatures throughout the structure.

The invention has for further objects such other improvements and such other operative advantages or results as may be found to obtain in the processes or apparatus hereinafter described or claimed.

In underjet coke ovens, the distributive systems for the underfiring gases of higher thermal content comprise interconnecting conduits or pipes that spread out as a sort of network beneath the supporting-mat of an entire battery of such ovens and are generally arranged to distribute heating gas from a common point to all of the heating flues of the coke ovens comprising the battery. In such coke ovens, the distributive systems for their rich fuel gas have been heretofore located in the open space of a basement or of accessible passageways located beneath the battery-supporting mat, and from such location the various regulatory features for adjusting the flow of heating gas to the heating flues individually, are conveniently accessible to the coke-oven operators. In general, such distributive systems comprise a principal supplying-main that is communicably connected with a reservoir of rich gas outside the battery structure, and as it extends along beneath the battery, it has branching therefrom a plurality of header-pipes each located generally beneath a single heating wall and extending in substantial parallelism therewith. From each such header-pipe, if not all, each at least of a large portion of the heating flues of the heating wall thereabove is provided with individually regulated quantities of heating gas apportioned thereto by the action of flow-control means located in a riser pipe that extends upwardly from said heating-wall header-pipe and communicably connects it with a single heating flue by means of a vertically-disposed conduit or duct that itself extends from the lower surface of the supporting-mat for the battery upwardly through a regenerator wall and finally ports at its upper end in the lower part of a heating flue.

In prior practice, the heating-wall header-pipes of such rich fuel-gas distribution systems have been usually dependent from the lower side of the battery-mat and therefore outside the structural mass thereof where they were exposed to all the thermal conditions and fluctuations thereof occurring in the basement of the battery. In consequence of recent improvements contributed to the by-product coke-oven art and designed to maintain the mat and the atmosphere in the battery basement at lower temperature levels not only for the purpose of protecting the structural materials but of providing comfortable working conditions therein, such improvements being exemplified for example in the improvements found in Joseph Becker U. S. Patents Nos. 2,102,608 and 2,102,609 issued December 21, 1937, and which provide means for withdrawing the whole or a part of the required combustion-air for under-firing the battery from the basement thereunder, the range of the temperature-fluctuations in the atmosphere of the battery-basement has latterly assumed increased importance because the preferred lower range of temperatures maintainable in this part of the battery by means of the cited improvements can, under certain circumstances and conditions of weather, have the effect of so reducing the temperature of the rich fuel-gas, as it is flowed through its distribution system, that there appear condensates therein which can become a source of considerable perplexity to the operator. This situation more especially arises at points in the distributive system more remote from the inlet thereto where the exposure is longer. Such condensates have a tendency to accumulate in the relatively small openings of the flow-control means for regulating the volumes of gas apportioned to the separate heating flues, thus altering their calibration and making it extremely difficult to maintain any extended period of operation of the ovens with uniform thermal conditions along the heating walls without a constant cleaning of the header-pipes as well as those devices for apportioning fuel gas directly to the separate heating flues.

Preheating of the rich fuel gas to reasonable temperatures, at the inlets of their distributive systems, has been shown to be incompletely satisfactory because under certain weather conditions it has been found that the so-added heat is lost by radiation in even reasonably lagged header-pipes and as will be appreciated by those experienced in the art, this circumstance becomes increasedly aggravated in larger batteries of ovens which, for reasons of economy, have been furnished with but one inlet to the rich gas distribution system. A reasonable amount of lagging on the relatively small header-pipes has been found beneficial but not to be a complete solution of the described potential source of operating disturbance.

According to the present invention those header-pipes, that branch from the principal supplying-main of the rich fuel-gas distribution systems for underjet coke-oven batteries and supply such gas directly to heating walls thereof, are located closely adjacent to or are partially or completely included within the structural mass that forms the supporting-mat for such batteries. In such location, the said header-pipes are preferably completely surrounded by the material of the mat (usually reenforced concrete) which thus assumes the role of insulation-means for the header-pipes and shields them against fluctuations of temperature in the atmosphere of the battery basement. At similar levels thereof, the temperatures in the interior of the mass of the battery-mat are at all times relatively constant in consequence of heat being continuously conducted into it from the heated masonry of the regenerators and their sole-channels immediately thereabove, such thermal conditions being by this means relatively uniformly maintained from one end of the battery to the other. Embedding of the header-pipes in this portion of the battery structure therefore furnishes the beneficial results that the smaller streams of fuel gas flowed into such headers are well protected against loss of their heat content—they can under certain circumstances actually absorb heat from the surrounding mat—and also that the fuel gas in all of such heating-wall header-pipes for an entire battery are at substantially the same level of temperature, thereby greatly simplifying the problem of uniform heat distribution because the fuel gas will thus arrive at the flow-control means of all the individual heating flues at substantially the same temperature. In those instances where the temperature is relatively high at which undesirable condensates appear in an individual fuel-gas, the improvement provided by the present invention may be used in combination with a step for pre-heating such gas before it enters the distribution system and the instant improvement will operate to prevent substantial loss of the heat added by the said preheating step.

Other advantages provided by the invention reside in the fact that, for a given height of those columns that support the battery-mat, there results an increased free space in the basement of the battery and in the fact that the material of the pipe-headers can serve to replace reenforcing steel that would otherwise be required for the strengthening of the mat-structure.

In the accompanying drawings forming a part of this specification and showing for purposes of exemplification a preferred apparatus and method in which the invention may be embodied and practiced but without limiting the claimed invention specifically to such illustrative instance or instances:

Fig. 1 is a vertical sectional elevation taken crosswise of a battery embodying the present improvement, said section being taken in part through a coking chamber and in part through a flued heating wall;

Fig. 2 is a composite vertical section taken lengthwise of the battery illustrated in Fig. 1, sections A—A and B—B being taken respectively along the lines A—A and B—B of said figure;

Fig. 3 is an enlarged fragment, parts in section, showing the heating-wall header-pipes of invention in combination with means for regulating the volume of rich fuel-gas flowed into a heating flue;

Fig. 4 is a modification of Fig. 3, showing the wall-headers only partially embedded in the mat; and Fig. 5 is a modification of Fig. 3.

The same characters of reference designate the same parts in each of the views of the drawings.

Referring now to the drawings: there is illustrated a coke-oven battery of the underjet class having the well-known heating flue construction characteristic of the Becker oven. The present invention has been embodied for purposes of its following description in a battery of this type both because it is representative of the type for which the improvement has been provided and for the sake of simplicity, although it will be understood that the features of invention are equally suitable for employment in all classes of coke-ovens supplied with rich fuel-gas according to the underjet principle.

The illustrated coke-oven battery comprises a plurality of the usual coking chambers 10, 10, disposed lengthwise of the battery in alternation with heating walls 11, 11. The heating walls are each sub-divided into a plurality of vertically-disposed heating flues 12, 12, of which each is adapted for underfiring with regeneratively-preheated and non-regeneratively-preheated fuel gas. Beneath sole-flues 13, 13, of regenerators 14, 14, is the battery-supporting mat 15 which serves to support the masonry of the entire battery-block thereabove from side to side and from end to end thereof. Mat 15 is itself supported on a plurality of piers 16, 16, that are carried on a basal structure or foundation-plate 17. Between said mat 15 and foundation-plate 17, there is the battery basement which comprises passageways 18 through which the oven operators can walk beneath the entire battery and from which passageways equipment for controlling the flow of heating gas to the heating flues are accessible for regulation.

Coal charged into coking chambers 10 through charging holes 19, 19, is carbonized by heat absorbed from the heating walls 11, 11. The vertical heating flues 12, 12, of said heating walls in the illustrated battery can be optionally heated either by the combustion of regeneratively preheated lean gas such as blast-furnace or producer gas which is flowed into the sole-channels 13, 13, and thence into regenerators 14, 14, from lean-gas mains 20, 20, that themselves can be intermittently communicably connected with said sole channels by means of valved flow-regulating boxes 21, 21, and of which some of the boxes are disposed to introduce either lean fuel gas or air into the regenerators in one regenerative phase and to direct combustion-products into waste-gas tunnels in the other phase whereas others are adapted to flow only combustion-air into the regenerators in one regenerative phase and to cause combustion-products to flow into said waste-gas tunnels in the other phase.

Heating flues 12 each communicate with two regenerators 14, that are located on opposite sides of the regenerator capital-walls 23, by means of a pair of ducts 24. When underfiring only with regeneratively-preheated combustion media, in one regenerative phase one of said regenerators is preheating combustion-air while the other on the opposite side of a regenerator wall 23 is preheating a fuel gas of low thermal content before they enter the heating flues there to burn, and during the next phase both of said regenerators are flowing combustion-products to the waste-gas tunnel, and during a regenerative heating cycle such a regenerator pair simultaneously operates as inflow and outflow regenerators in alternation.

At such times as the illustrated battery is being heated with a rich fuel-gas that does not require a regenerative preheating step for its effective combustion therein, all of the regenerators operate in alternation to preheat only air and to carry away combustion-products from the heating flues, and the heating gas is flowed into the heating flues 12 from a distributive system therefor located in part in the basement 18.

The rich fuel-gas distribution system comprises the principal supplying-main 25 that extends longitudinally of the battery substantially its entire length and communicably connected therewith by means of the geniculate piping-connections 26, there is for each heating wall a header-pipe 28 that extends from end to end thereof. The said piping-connections 26 contain the valve means 27 which is operative by the flow-reversing mechanism for the battery to flow rich fuel-gas into the header-pipes 28 at such times as the heating flues of the heating wall thereabove are up-burning or flame flues. Branching from each header-pipe to each of the heating flues of its associated heating wall, there is conduit means adapted for flowing rich gas into the flues in regulated quantities, each such conduit means comprising a short pipe-length 29, a pipe-cross 30, a vertically-disposed pipe 31, that extends upwardly from the upper branch of said pipe-cross through battery mat 15, and a duct 32 formed in a regenerator wall 23. At its lower end, duct 32 communicates with pipe 31 and, at its upper end, ports into the lower part of a heating flue.

For adjusting the volume of rich fuel-gas flowed from header-pipe 28 into the individual heating flues, each pipe-cross 30, as clearly shown in Fig. 3, is provided with a replaceable orifice-plug 33 having a perforation 34 through which fuel gas is flowed into pipe 31, as indicated by the arrows, and thence to a heating flue. Orifice-plug 34 is positively mounted on the inner walls of the pipe-cross by means of threads and is replaceable by another having an aperture with a different calibration by removing pipe-cap 35 from the opposite branch of the pipe-cross, the battery-mat being provided with a shallow crosswise-extending channel 36 of sufficient width to permit convenient access to said plug from the battery basement. This gas-flow regulating arrangement is described in a co-pending application of Gustaf E. Salkvist S. N. 256,427 filed February 15, 1939. It has been employed in combination with the present invention because it advantageously provides a means whereby the volumes of fuel gas flowed to individual heating flues can be conveniently varied without breaking the walls of permanent connections between the header-pipe 28 and the pipe 31, this being an important feature in that as a result it is possible, if desired, permanently to embed both members 28 and 31 in the structural mass of the battery-mat and to leave only relatively short lengths of exposed piping therebetween.

According to the improvement provided by the present invention and as clearly shown in Figs. 2 and 3, the heating-wall header-pipes 28 are, in contrast to prior practice in which they were suspended from or at least located below the lower surface of the battery-mat, are preferably embedded within the structural mass of the mat itself where they not only have the advantage of its protection against fluctuations in temperature of the atmosphere of the battery basement, which in consequence of recent developments in the art are now advantageously restrictable to a temperature range so lowered from that which formerly obtained in this part of the battery that the distributed fuel-gas can at times be reduced to temperatures below that at which condensates develop therein, but are able to utilize heat conducted into the mat from the closely adjacent regenerator structure to maintain them and the fuel gases flowed therethrough above temperatures at which condensates can be formed in the gas streams, thereby eliminating possible tendency of such condensates to collect in the small metering apertures in the flow-control means and to alter their calibration. At the same levels thereof, the temperatures of the mat are substantially uniform. By therefore locating the heating-wall header-pipes all at substantially the same level of the mat, the present invention provides means whereby fuel-gas flowed through all the said header-pipes can be maintained at approximately the same temperature throughout the entire battery thereby obviating the disadvantageous and formerly observed drop in fuel-gas temperatures especially at points remote from the inlet to the distributive system.

From the top of the mat-structure to the lower surface thereof there is a considerable drop in its temperature in a heated battery, for example, when the top of the mat averages 175° C., the zone adjacent the lower surface may average 110° C. This temperature difference may however be modified by such factors as the actual thickness of the mat and its materials of construction, the quantity of insulating material between the bottom of the sole-flues and the top of the mat, the number and thickness of the brick-courses in the bottom of the sole-flues, and the atmospheric temperature and the extent of ventilation in the battery-basement. Also, in the regenerative heating cycle, the said temperature difference between the mat's upper and lower surfaces will fluctuate accordingly as the sole-flues above a mat-section are inflowing or outflowing sole-flues. During the construction of the battery, the heating-wall headers-pipes should be located at those mat-levels of any particular installation which are best suited to the characteristics of the to-be-employed fuel gas to provide the advantages obtainable by the present invention.

In those applications of the present invention where it is employed in battery-structures with higher temperatures in the mat such as obtains in those instances where the mat is relatively thin or where there is little if any provision of insulating material between the top of the mat and the lower part of the regenerator sole-ducts with resultant higher temperatures in the mass of the mat, it is desirable to surround the heating wall-headers only partially with the mat's structural material, as shown in Fig. 4, thereby taking advantage of only a part of the mat's capacity to heat and protect the wall-headers, the exposed portion being optionally covered with insulation 42. In other such instances it will be sufficient to place the wall-headers in substantial contiguity with the lower surface of the mat so that the gas is heated but not too much by the radiation of heat from the mat.

By providing means whereby improved uniformity of fuel-gas temperature can be maintained at the inlet of all the flow-control means for the individual heating flues, uniformity of heating in the heating walls is greatly facilitated, calibration of the flow-control means for the entire battery is significantly simplified and by eliminating the possibility of the formation of condensates in the distributed gas, a serious obstacle to continued regularity in the heating of underjet coke-ovens is eliminated.

The invention not only contemplates forming the heating wall-headers integral with the mat but also proposes the provision of pre-formed conduits in the mat and into which the wall-headers may be inserted and either tightly or loosely fitted depending upon the degree of atmospheric circulation it is desired to promote between the walls of said pre-formed conduits and the external walls of the wall-headers, as shown in Fig. 5, wherein a wall-header 37 is shown loosely as well as removably positioned in pre-formed conduit 38. By extracting pipes 29 from threads 40 whereby they are attached to said wall-header, the latter is slideably removable from the pre-formed conduits 38. The free-space 41 between the exterior of a header 37 and the inner walls of a pre-formed conduit may be optionally adjusted to give a preferred regulation of atmospheric circulation therethrough from the open ends at the battery faces.

It is of course obvious that heat supplementary to that absorbed from the mat may be added to the fuel gas, as for instance by a preheating step therefor as it enters the distributive system, and that the material of the mat-structure, operating as insulations means, will function to obviate extensive loss of the so-added heat by radiation.

The invention as hereinabove set forth is embodied in particular form and manner but may be variously embodied within the scope of the claims hereinafter made.

I claim:

1. Underfiring apparatus for a regeneratively heated coke-oven of the underjet type having a coking chamber and flued heating walls therefor disposed on opposite sides thereof, regenerators therebeneath, a massive supporting structure beneath the regenerators and itself supported above an accessible passageway, and a distributive system for supplying non-regeneratively-preheated fuel gas to the flues of the heating walls comprising a principal conduit having communicably connected therewith a plurality of horizontal subordinate conduits each individual to and in substantial parallelism with an associated heating wall and extending longitudinally beneath the regenerative system, and riser conduits with regulating devices therefor communicably connecting the respective flues of the heating walls with the horizontal subordinate conduits, and in which the subordinate conduit for a heating wall is disposed in contact with the oven supporting mass so that heat will be derived therefrom by the subordinate conduit to overcome substantial tendency toward loss of such heat by a fuel gas flowed therethrough as would cause condensation from gas in the horizontal subordinate conduit.

2. Underfiring apparatus for a regeneratively heated coke-oven of the underjet type having a coking chamber and flued heating walls therefor disposed on opposite sides thereof, regenerators therebeneath, a massive supporting structure beneath the regenerators for supporting the oven above an accessible passageway, and horizontal duct means for flowing non-regeneratively-preheated fuel gas to the heating flues of the respective heating walls, the duct means for a heating wall comprising a duct extending lengthwise of the heating wall and imbedded in the massive supporting structure and having upwardly leading communicable connections disposed therealong and provided with regulating means, for flowing regulable quantities of non-regeneratively-preheated fuel gas into a plurality of heating flues of the heating wall individually.

3. Underfiring apparatus for a regeneratively heated coke-oven of the underjet type having a coking chamber and flued heating walls therefor disposed on opposite sides thereof, regenerators therebeneath, a massive supporting structure beneath the regenerators for supporting the oven above an accessible passageway, and a distributive system for supplying the flues of the heating walls with non-regeneratively-preheated fuel gas, said system comprising for a heating wall a horizontal conduit beneath the regenerative system extending lengthwise of the heating wall and partly imbedded throughout its length in the oven supporting mass, and riser channels with regulating means therefor rising from the partly imbedded conduit to the heating flues of the heating wall.

4. In a regeneratively heated coke-oven of the underjet type having flued heating walls on opposite sides of a coking chamber disposed between the flued heating walls, regenerators beneath the heating walls and chamber, a massive supporting structure adjacent the base of the regenerators for supporting the oven above an accessible passageway, and duct means extending longitudinally of the heating walls under the regenerators for flowing non-regeneratively-preheated fuel gas to heating flues of heating walls thereabove, the duct means for a heating wall being surrounded by and contiguous with the oven supporting mass and having communicable connections therealong including regulating means for flowing regulable quantities of non-regeneratively-preheated fuel gas into a plurality of heating flues of the heating wall individually.

5. In a regeneratively heated coke-oven battery of the underjet type having a plurality of coking chambers disposed in alternation with flued heating walls therefor, the combination of: bores extending crosswise of the battery substantially in contact with the mass of the battery-supporting mat, and within said bores replaceable ducts substantially co-extensive with said bores, said ducts communicating with offtakes therealong having regulating means therefor for the distribution of regulable quantities of non-regeneratively-preheated fuel-gas to each of a plurality of heating flues of a heating wall.

6. In a regeneratively heated coke-oven battery of the underjet type having a plurality of coking chambers disposed in alternation with flued heating walls therefor, the combination of: a battery-supporting mat that is itself supported above accessible passageways; a distributive system for flowing non-regeneratively-preheated fuel gas to a plurality of heating walls from a common conduit, said system comprising a principal conduit having communicably connected therewith a plurality of secondary conduits of which each is individual to a heating wall of the plurality thereof served by said distributive system, and is included in the material of the battery-supporting mat and has communication with means for regulating the flow of non-regeneratively-preheated fuel gas to a plurality of heating flues in a heating wall, said regulating means being disposed substantially along a horizontally-extending plane intersecting said secondary conduits; and, in the lower surface of the battery-supporting mat, recesses adapted to provide access from the battery basement to the said flow-regulating means.

7. In a regeneratively heated coke-oven battery of the underjet type having below the regenerative system a distributive system for flowing non-regeneratively-preheated fuel-gas to a plurality of heating walls from a common conduit, said distributive system comprising wall-headers that are surrounded by the mass of said battery-supporting mat and have communication with flow-regulating means that are positioned above the lowest level of said wall-headers, accessible from under the mat, and communicate with upwardly extending ducts leading to the heating flues for flowing regulable quantities of gas to heating flues, and recesses in the lower surface of said mat and extending crosswise of the battery, adapted to provide access to said flow-regulating means from below said mat.

8. In a regeneratively heated coke-oven of the underjet type having a distributive system for non-regeneratively-preheated fuel gas, comprising a heating-wall distributor-header disposed lengthwise of the heating wall and enclosed in a massive structure in contiguity with material of the oven-supporting mat, and branch-conduits extending from such distributor-header upwardly through the lower part of the oven structure to communicably connect said header with the heating flues of the heating wall, said branch-conduits each having a device accessible from beneath the oven mat for adjustment of means for regulating gaseous flow between said header and the respective branch-conduit.

9. In a regenerative underjet coke-oven having horizontal branch conduits adapted for feeding a non-regeneratively-preheated fuel gas comprising a constituent that is condensible at atmospheric temperatures from a main to ducts that rise upwardly through the lower part of the oven structure to the heating flues and that are provided with regulating devices accessible for regulation from an accessible passageway underneath a horizontally extending supporting mass for supporting the oven above the passageway, said horizontally extending supporting mass comprising a massive portion under the regenerators in proximity to the base of the regenerators and of a thickness adapted to have in operation a temperature gradient between the top and bottom of the supporting mass including temperatures above the dew-point of said condensible of the fuel gas, and the horizontal branch conduit for a heating wall of the oven being located within said massive structure forming a part of the supporting mass at a temperature region thereof which is adapted to heat the branch conduit to prevent substantial condensation of said condensible from the fuel gas flowed through the branch-conduit without material decomposition of the gas.

10. An oven as claimed in claim 9 and in which the horizontal branch-conduit is located within a preformed conduit with a free space therebetween for atmospheric circulation along the outside of the horizontal branch conduit within the preformed conduit.

11. Underfiring apparatus for an underjet regenerative coke-oven having a coking-chamber with flued heating-walls on either side thereof and regenerators beneath, comprising in combination a massive supporting structure under the regenerators and itself provided with supporting pillars disposed to afford below it a basement freely accessible to operators for manipulation of the underjet regulating means, an external main gas-supply conduit for non-regeneratively preheated fuel-gas for a plurality of heating-walls, a header duct leading from said main supply-conduit and extending therefrom lengthwise in parallel with a heating-wall and below the bottom level of the regenerators, riser ducts connected at intervals along said header and leading therefrom up into the respective flues of the heating-wall to lead the fuel-gas into said flues individually, and regulating means connected with the lower ends of said risers respectively and disposed for being regulated by manipulation in said accessible basement; the said header being disposed within and enveloped by the aforesaid massive supporting structure so that said massive structure may protect the header gas-flow and maintain desired elevated temperatures in the header, and the aforesaid regulating means protruding from the aforesaid massive supporting structure to afford the aforesaid accessibility for manipulation from beneath said massive supporting structure.

12. Underfiring apparatus for an underjet regenerative coke-oven having a coking-chamber with flued heating-walls on either side thereof and regenerators beneath, comprising in combination a massive concrete supporting structure under the regenerators and itself provided with supporting pillars disposed to afford below it a basement freely accessible to operators for manipulation of the underjet regulating means, an external main gas-supply conduit for non-regeneratively preheated fuel-gas for a plurality of heating-walls, a header duct leading from said main supply-conduit and extending therefrom lengthwise in parallel with a heating-wall and below the bottom level of the regenerators, riser ducts connected at intervals along said header and leading therefrom up into the respective flues of the heating-wall to lead the fuel-gas into said flues individually, and regulating means connected with the lower ends of said risers respectively and disposed for being regulated by manipulation in said accessible basement; the said header being disposed within and enveloped by the aforesaid massive concrete supporting structure so that said massive concrete structure may protect the header gas-flow and maintain desired elevated temperatures in the header, and the aforesaid regulating means protruding from the aforesaid massive concrete supporting structure to afford the aforesaid accessibility for manipulation from beneath said massive concrete supporting structure.

13. Underfiring apparatus for an underjet regenerative coke-oven having a coking-chamber with flued heating-walls on either side thereof and regenerators beneath, comprising in combination a massive supporting structure under the regenerators and itself provided with supporting pillars disposed to afford below it a basement freely accessible to operators for manipulation of the underjet regulating means, an external main gas-supply conduit for non-regeneratively preheated fuel-gas for a plurality of heating-walls, a header duct leading from said main supply-conduit and extending therefrom lengthwise in parallel with a heating-wall and below the bottom level of the regenerators, riser ducts connected at intervals along said header and leading therefrom up into the respective flues of the heating-wall to lead the fuel-gas into said flues individually, and regulating means connected with the lower ends of said risers respectively and disposed for being regulated by manipulation in said accessible basement; the said header being disposed within and enveloped by the aforesaid massive supporting structure so that said massive structure may protect the header gas-flow and maintain desired elevated temperatures in the header, and the aforesaid regulating means protruding from the aforesaid massive supporting structure to afford the aforesaid accessibility for manipulation from beneath said massive supporting structure, and the risers being connected laterally with the header and having their connected regulating means arranged to protrude laterally from the massive supporting structure into recessing provided in said massive structure to facilitate access to said regulating means.

JOSEPH van ACKEREN.